Aug. 6, 1929.                I. LANGMUIR                1,723,869
                    ELECTRICAL DISCHARGE DEVICE
                       Filed Dec. 21, 1922
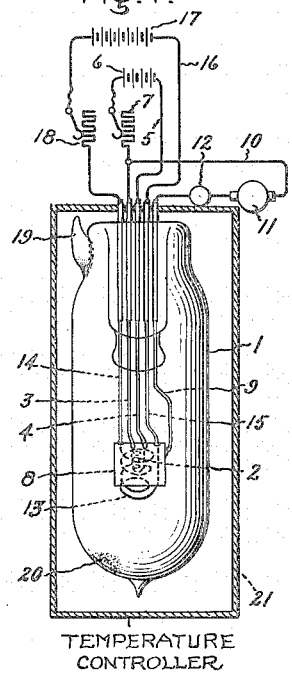
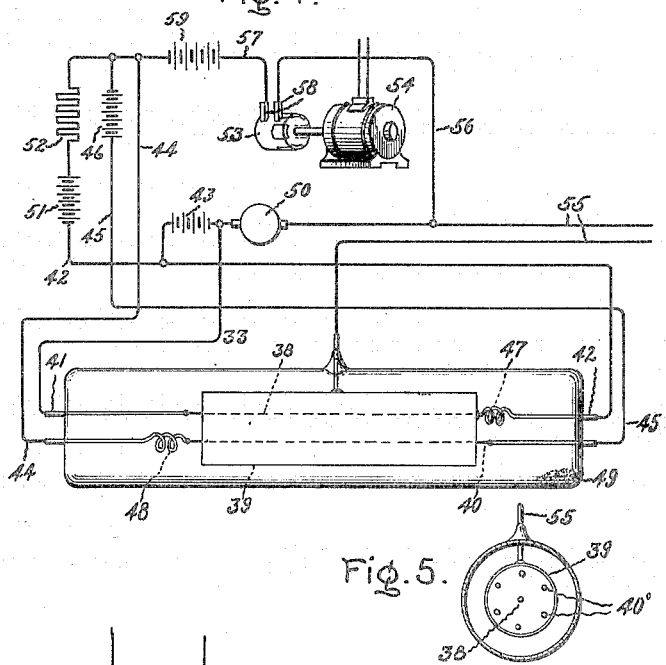
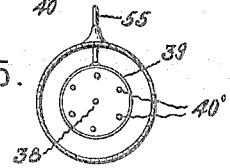
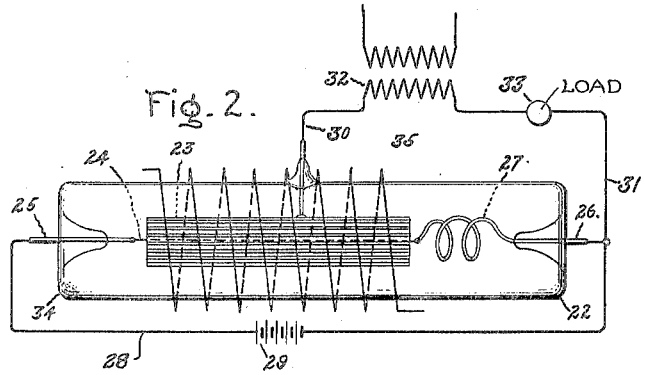
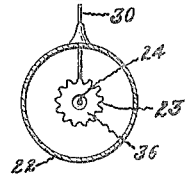
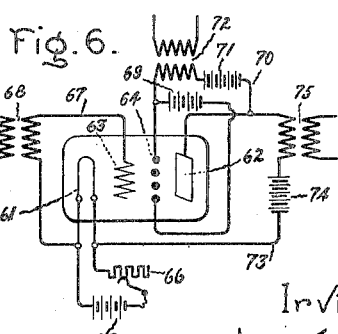
Inventor:
Irving Langmuir,
by *Alexander D. Smith*
His Attorney.

Patented Aug. 6, 1929.

1,723,869

UNITED STATES PATENT OFFICE.

IRVING LANGMUIR, OF SCHENECTADY, NEW YORK, ASSIGNOR TO GENERAL ELECTRIC COMPANY, A CORPORATION OF NEW YORK.

ELECTRICAL DISCHARGE DEVICE.

Application filed December 21, 1922. Serial No. 608,217.

My present invention relates to the conduction of electricity through an evacuated space by electrons; and, as a consequence of my invention, I have provided a new method whereby electric currents, particularly large power currents may be transmitted in vacuum devices at a higher efficiency than heretofore attainable and with other attendant advantages.

In electrical discharge devices embodying the principle of conduction by electrons in the absence of appreciable gas ionization, the mutual repulsion of the negative electric charges of the electrons, opposes the conduction of current. This repulsion effect, known as "space charge", must be overcome by the impressed voltage. In electronic devices heretofore used, the fall of voltage in the device due to space charge has been so considerable that the energy losses in electronic devices of large power capacity could be tolerated only when the external load operated at rather high voltage. For example, in a thermionic cathode rectifier operating by substantially pure electron conduction, the conduction of one ampere usually consumes several hundred volts in the device itself, and hence such a device could be used at an operating efficiency of, say 90% only when the total circuit voltage was at least as high as several thousand volts.

It has been known that this high space charge could be overcome by the presence of positive ions resulting from ionization by collision of electrons with gas atoms in the device, and in certain industrial electron discharge devices, an ionizable gas, as, for example, argon or mercury vapor, has been introduced to neutralize space charge by reason of its ionization and thereby to lower the voltage drop. The presence of such a gas while highly beneficial for some purposes has been accompanied by various limitations, as for example, the tendency for the discharge to get out of control and the incidental disintegration of the cathode by excessive positive ion bombardment.

In accordance with my present invention, I have provided electronic devices in which space charge is neutralized by positive ions which are generated independently of gas ionization by collision. In its preferred embodiment my invention, therefore, provides means for conducting electricity through an evacuated space by a new method in which the advantages of electronic conduction are preserved without the limiting conditions due to space charge.

The generation of positive ions occurs by contact with a heated, positively charged electrode, (which hereinafter is termed the genode), of a material having electrical properties correlated with the electrical property of the surface of the genode in a manner to be later explained. When the genode consists of tungsten the vapors of alkali elements, and in particular, the alkali metals cæsium and rubidium are capable of efficiently generating positive ions. This method is adapted for the generation of positive ions in substantial quantities in a regular reproducible manner. These ions are capable of neutralizing the space charge of electronic currents which may be many times, in fact, thousands of times, greater than the positive ion current.

This method of generating positive ions involving coaction of a gaseous material and a heated positive electrode which may also function either as anode or grid is described and claimed in U. S. Patent 1,648,183 issued November 8, 1927 to Kingdon and Langmuir, and will be referred to herein as surface ionization.

As will be later explained, the large neutralizing capacity of positive ions is due to fortuitous coaction of several factors such as the slower movement of positive ions relative to electrons which causes them to remain in the path of current conduction for a greater length of time than the electrons, and also to the longer paths of travel of positive ions in devices of suitable construction.

The accompanying drawing shows in Fig. 1 a simple embodiment of my invention; Fig. 2 illustrates a two electrode device in which one of the electrodes is heated by radiation, Fig. 3 is a sectional view of the device shown in Fig. 2; Figs. 4 and 5 illustrate another modification, and Fig. 6 is a diagram showing connections suitable for a four electrode device embodying my invention.

The device shown in Fig. 1 which illustrates one embodiment of my invention comprises an evacuated container 1, consisting of glass or other suitable material, containing a thermionic cathode 2, constituted by a coiled filament of tungsten, or other suitable electron-emitting material, and connected to sealed-in conductors 3, 4. An external circuit 5 contains a source of current, represented by a battery 6, and a variable resistance 7. Surrounding the cathode 2 is a cylindrical anode 8 also conveniently consisting of tungsten and carried by a sealed-in conductor 9. An external circuit 10 containing a current source 11 and a load 12 is connected between the cathode 2 and the anode 8. A coiled tungsten or nickel filament 13 constituting the genode is located between the cathode 2 and the anode 8, which is supported to sealed-in conductors 14, 15, and connected thereby to an external heating circuit 16 containing a current source represented by a battery 17, and also a regulating resistance 18.

Before the material which serves to generate positive ions is introduced, the container and the electrodes are freed from gas, and the space within the container preferably is evacuated according to well understood exhaust methods. After evacuation an easily vaporizable material having in the vapor, or gaseous state, a low ionizing potential is introduced, as for example, a member of the alkali group, preferably caesium or rubidium. An alkali metal may be introduced from a reduction tube (not shown) communicating with the discharge device. This tube is provided with a material capable of evolving the desired alkali metal, for example, a mixture of caesium chloride and a reducing agent such as magnesium or calcium, the latter being in excess. After sufficient caesium, or other desired material, has been introduced to serve as a source of vapor, the tube is sealed off in the usual manner, as indicated at 19. For the purpose of illustration I have indicated at 20 in Fig. 1 an excess of vaporizable material as present in the device. The vapor pressure of the ion-generating material may be controlled by an external heater, or heat-insulator indicated by the dotted outline 21.

The vapor pressure should be maintained below a value at which the electron discharge in the vapor will be accompanied by appreciable ionization by collision, that is, below about 70° C. in the case of caesium. The particular vapor pressure depends on the character of the device. At 70° C. the vapor pressure of caesium is about 0.0001 of a m. m. of mercury (a tenth of a micron). In any event, the vapor pressure should be below the value at which a self-sustaining discharge is produced.

When the cathode 2 is heated to a temperature sufficiently high to give a desired electron emission, and when a potential is applied between the electrodes 2 and 8, as shown, then, in the absence of ion generation in accordance with the present invention, pure electron conduction occurs by well-known laws, the current being determined and limited by space charge up to a value of impressed voltage which is sufficiently high to cause all of the emitted electrons to be drawn to the positive electrode 8. At this impressed voltage the saturation current is obtained and higher voltages produce no further increases in current. As stated above, the voltages consumed in the device in order to overcome space charge may be a very considerable part of the total voltage. When the electrode 13 is heated to obtain a generation of positive ions, then the opposition to flow of electron current by space charge is reduced. With a sufficient generation of ions the space charge effect is substantially eliminated.

Before describing the operation of the devices illustrated, a brief explanation of the electrical characteristics of positive ion currents will assist in arriving at an understanding of my invention.

The positive current obtained depends on the positive ion emission and the impressed voltage. Hereinafter the adjective "positive" before "ion" will be omitted for the sake of brevity. The ion emission depends on the temperature of the ion-generating electrode or genode, and the vapor pressure of the active gaseous material.

The genode temperature at which an emission of ions is obtained varies somewhat with the nature of the ion-generating material in the device and other conditions, but in general it may be said that there is a definite temperature for any given genode material above which atoms striking the genode leave the same as ions. For a given tube this temperature is critical. It differs somewhat in different tubes depending on the character of the active materials and other conditions. In the case of a genode consisting of tungsten and containing caesium as the active material, the critical temperature may range from about 1000 to 1200° C. Above the critical temperature, the particular value of which may be determined for any given device, the ion emission obtained is proportional to the vapor pressure. The ion emission is substantially independent of the genode temperature providing the genode temperature is above the critical value.

In general in order to get a saturated positive ion current, that is to draw away from the genode all the ions generated, a negative voltage is required on some other electrode because of a positive ion space charge. In case there is an electron current flowing, the ion current will be neutralized providing the electron current is sufficiently great. Ordinarily it requires an electron current many hundreds of times greater than a given ion current to completely neutralize a given ion current.

The positive space current in the absence of accompanying electron conduction varies as a 3/2 power function of the impressed voltage up to a voltage value high enough to produce a saturation current and then becomes substantially constant for higher voltages. It is steady for a constantly applied voltage and reproducible for different voltages.

Even though the positive ion currents are relatively small, I find that under suitably chosen conditions they can be used to neutralize the negative space charge of enormously greater electron currents. Assuming that the ions are permitted to travel by the most direct path to a cathode from which electrons are emitted, then the greater mass of the ions and their slower speed will enable a given positive ion current to neutralize the space charge of an electron current about 500 or more times greater.

When the paths of the positive ions are lengthened by causing them to travel by indirect paths to the cathode so as to remain for a longer time in the path of the electrons, then a given positive current may neutralize the space charge of a correspondingly larger electron current, say, several thousand times greater.

The device illustrated by Fig. 2 utilizes advantageously the increased effect of the ions when traveling in a long path to the cathode. This figure illustrates a device in which the anode 23 functions also as genode. It consisis of a cylinder having longitudinal corrugations, as best shown in Fig. 3, and which may be constituted of tungsten, molybdenum, or nickel. An electron-emitting cathode 24, consisting for example, of a tungsten wire extends axially through the anode and is connected to conductors 25, 26, sealed into the envelope 22, a spring 27 being provided to keep the filamentary cathode taut while incandescent. An external cathode heating circuit 28 is shown provided with a source of energy 29. The cathode and anode are connected to a circuit 30, 31, containing a supply source 32 represented by the secondary of a transformer, and a load device 33. A quantity 34 of caesium, or equivalent material, is present in the otherwise exhausted container.

When the electrode 23 is heated in any way to a sufficiently high temperature as by radiation, or by high frequency induction from a coil 35 surrounding the tube, it becomes a genode and generates ions from the caesium vapor. Current at high efficiency may be conducted through the device which with the particular connection illustrated will serve as a rectifier, when the genode is not at a sufficiently high temperature to give an appreciable electron emission. The electron emission from a negatively charged tungsten surface only begins to be appreciable at temperatures considerably above the temperature necessary for operation of an electrode as a genode. Commonly a tungsten cathode is operated at about 2200 to 2400° C. Direct current as indicated in other modifications may be used with the device of Fig. 2. Due to the irregularities in the cylinder surface, the ions do not travel by the most direct path to the cathode. As they have a component of motion perpendicular to the radius (tangential component) they circulate many times about the cathode before discharging upon the cathode. Preferably end plates 36 are provided at the ends of the genode, as shown in Fig. 3, which when positively charged, as by connection to the anode, prevent escape of the ions at the ends, thereby enhancing the effect of the ions in neutralizing space charge. The trapping of positive ions in the generic sense by end plates or other suitable construction is described and claimed in a Patent No. 1,579,117, issued on March 30, 1926, to Kenneth H. Kingdon.

The device shown in Fig. 4 contains in addition to an electron-emitting heated cathode 38, and an unheated cylindrical anode member 39, also a genode 40, constituted by a filament of nickel, tungsten, or other suitable material. Only a single genode filament has been shown for the sake of simplicity in the illustration but obviously a plurality of genode conductors can be used to advantage, as indicated at 40', Fig. 5. The cathode 38 is connected externally by conductors 41, 42 to a source of heating current, represented by a battery 43. The genode 40 is similarly connected by the conductors 44, 45 to an energy source, as represented by a battery 46. The cathode 38 and the genode 40 are provided respectively with springs 47, and 48, to maintain said electrodes taut when heated to the operating temperature. A quantity of caesium 49, or other suitable ion-generating material is present in the evacuated container. The generation of positive ions at the genode has been described. A source of current represented by a direct current generator 50 is connected between the anode and the cathode through an external load (not shown).

The current between the cathode 38 and the anode 39 can be varied by varying the polarity of the genode 40 from a positive to a negative direction and vice versa. For example, when the genode 40 is sufficiently positive with respect to the cathode 38 with a sufficiently high pressure of caesium, or the like, in the discharge space, the emission of positive ions can be made great enough to substantially eliminate space charge.

When the polarity is changed to a negative direction, the emission of positive ions first will decrease so that the space charge limitation of current appears. Then as the genode becomes more negative, the current between the electrodes 38 and 39 is still further decreased.

The drawing shows an arrangement for alternately making the polarity of the genode 40 positive and negative. A suitable source of potential represented by a battery 51 is connected in series with a high resistance 52 between the cathode circuit 42, and the genode circuit 45. A commutator 53 driven by a motor 54, alternately connects and disconnects the positively charged anode circuit 55 to the genode circuit 44 by conductors 56 and 57 which are connected to the brushes 58 of the commutator. If desired, a source of potential (represented by the battery 59) may be included in the circuit 57, which connects the positive pole of the generator 50 to the genode through the brushes 58 when the latter bear on a conductive segment of the commutator.

When the genode 40 is negatively charged through the resistance 52, substantially no current passes between the electrodes 38 and 39. When the genode 40 is positively charged when connected to the anode circuit, positive ions are emitted, neutralizing space charge and permitting a substantial current to pass.

Of course, various structural modifications may be made in the described device without departing from my invention.

By the apparatus a pulsating current may be obtained in the output circuit 55, the current carrying capacity of the discharge tube varying sharply between a very low value when the genode 40 is negative and acts as a negative grid and a high value when the genode 40 is positive and acts as a genode to supply positive ions.

In some cases, current control may be exercised by a genode in addition to the control exercised by a negatively charged grid. I have shown diagrammatically in Fig. 6, a device containing in addition to the cathode 61 and an anode or plate 62, also an electrostatic input electrode or grid 63 and a genode 64, represented by dots. The cathode 61 is provided with a heating source 65 and a variable resistance 66. The grid circuit 67 contains an input source represented by a transformer 68. The genode 64 is maintained heated by a battery 69 and is connected to another input circuit 70, containing a polarizing source represented by the battery 71 and source of variable potential represented by the secondary of a transformer 72. The output circuit 73 contains a source of energy 74 and a load device, represented by the primary of a transformer 75.

The grid 63 and genode 64 exercise an independent control upon the electron current. For example, the potential of the grid 63 may vary the electron current to produce an alternating current in the output circuit 73, which is varied or modulated by the variations of genode potential. Preferably, the potential of the genode, varies above and below a positive value which is higher than the potential of the space between the grid 63 and the anode 62. In some cases the genode to advantage may be located close to the anode.

What I claim as new and desire to secure by Letters Patent of the United States, is:—

1. The method of controlling space charge in an electron discharge device to vary the current transmitted therein with a given impressed voltage which consists in generating positive ions in said device independently of ionization by electron impact, conducting away said ions and varying said ion current.

2. An electrical discharge device comprising an evacuated envelope, means therein for producing an electron discharge having space charge characteristics, a genode, a quantity of alkali metal having a vapor pressure at the operating temperature of said envelope which is sufficiently high to generate positive ions by surface ionization at said genode but having a vapor pressure too low to cause appreciable ionization by collision, and means for controlling the electric charge of said genode.

3. An electrical discharge device comprising an exhausted sealed container having residual gas pressure therein so low that electron conduction therethrough may occur without substantial gas ionization by collision, electrodes including a thermionic cathode, and means for controllably generating positive ions by surface ionization.

4. An electron discharge device comprising a sealed container, means therein for generating an electron discharge having space charge characteristics and separate means therein for generating positive ions, the space in said container being evacuated to a pressure so low that positive ionization of gas independently of said separate generating means is negligible.

5. An electrical discharge device comprising a container, a plurality of electrodes including a thermionic cathode and a genode, a quantity of caesium therein having a vapor pressure at the operating temperature of said container which is sufficiently high to generate positive ions at said genode but having a vapor pressure too low to cause appreciable ionization by collision, and means for controlling the electric charge of said genode.

6. An electrical discharge apparatus comprising a container, means therein for producing an electron discharge independently of and substantially without gas ionization by collision, and independent means therein for producing positive ion current, said means being designed to be used in a circuit containing a variable control member.

7. An electrical discharge device comprising a container, means therein for producing an electron discharge having space charge characteristics, independent means for generating positive ions, a separate circuit for conducting away said ions, and means for varying said positive ion current.

8. An electrical discharge device comprising a container, means therein for producing an electron discharge, an input electrode for controlling said discharge, a double terminal, independent electrode adapted to be heated, designed to receive a positive charge, and an alkali metal in said device capable of generating positive ions on said independent electrode by surface ionization.

9. An electrical discharge device comprising an evacuated container and electrodes therein including a linearly proportioned thermionic cathode, and a genode constructed to present surface elements extending in generally radially directions to said cathode, means for heating said genode, and means for generating positive ions at said genode.

10. An electrical discharge device containing an electron-emitting cathode having a main linear extension, an anode enclosing said cathode and having corrugations in the direction of said linear extension, and a material in said device adapted to generate positive ions at the surface of said anode, when said anode is heated to a sufficiently high temperature.

11. The method of neutralizing space charge in an electrical discharge device which consists in producing an electron discharge substantially independently of gas ionization by collision and independently generating positive ions in said device.

12. The method of neutralizing space charge of an electron-discharge which is substantially unaccompanied by ionization by collision, said method consisting in generating positive ions independently of said discharge and causing said ions to traverse a longer path than said electron discharge.

13. An electrical discharge device comprising an evacuated container, a charge of caesium therein, means therein for producing an electron discharge having space charge characteristics, an independent heatable electrode therein designed to be charged positively with respect to said means.

14. An electrical discharge apparatus comprising a container, means for producing an electron discharge therein without appreciable gas ionization by collision, independent means therein for generating positive ions by surface ionization, and a grid electrode for controlling said electron discharge.

15. The method of conducting current between cooperating electrodes in the presence of caesium vapor which consists in heating one of said electrodes to an operative temperature by the conduction of current therethrough and heating a cooperating electrode by radiation from the first electrode to a temperature at which caesium vapor generates carriers of current at said electrode.

In witness whereof, I have hereunto set my hand this 19th day of December, 1922.

IRVING LANGMUIR.